Aug. 6, 1968  D. L. SULLIVAN  3,395,436

ART OF ROD-END BEARING MANUFACTURE

Filed March 23, 1964

INVENTOR.
D. L. Sullivan
BY Morsell & Morsell
Attorneys

United States Patent Office 3,395,436
Patented Aug. 6, 1968

3,395,436
ART OF ROD-END BEARING MANUFACTURE
Donald L. Sullivan, 1416 Kentucky St.,
Oshkosh, Wis. 54901
Filed Mar. 23, 1964, Ser. No. 353,955
3 Claims. (Cl. 29—149.5)

This invention relates to improvements in the art of rod-end bearing manufacture, and more particularly to a rod-end bearing and an improved method of fabricating the same.

Rod-end bearings have many areas of industrial usefulness. Those in common use comprise generally a bored ball member, a cast or forged steel unitary housing and stud member machined with a specially shaped opening therein sufficiently large to turnably receive the ball member, and additional fabricated rings adapted to be forced into the excess space in the housing not occupied by the ball, the rings providing a spherical socket and locking device. The conventional rod-end bearings above generally described are expensive to fabricate, and have limitations.

A general object of the present invention is to provide a method of fabricating a rod-end bearing in which the various components are formed separately, the stud being manufactured independently of the housing, and the latter, which is an inexpensive stamping, is susceptible of being assembled with the stud in a very simple and inexpensive manner, there being no limit to the length or shape of the stud.

A further object of the invention is to provide a method of fabricating a rod-end bearing in which the housing possesses resistance to torque relative to the stud and requires only a simple inspection to determine whether or not it is properly formed.

A further object of the invention is to provide a method of fabricating a rod-end bearing wherein the components may be formed of a variety of metals which can be plated before or after forming the parts, and wherein the assembly operations do not destroy any preplated finish, resulting in a rod-end bearing assemblage which has a very satisfactory and acceptable appearance.

A further object of the invention is to provide a method of fabricating a rod-end bearing wherein the assembly pressures can easily be carried to produce a tight or loose fit of the ball unit in the housing according to the customer's requirements.

A further object of the invention is to provide a rod-end bearing and method of fabricating the same wherein the stud, the housing, the ring and the ball are all originally separately formed with the ring being thereafter compressed around the depending ends of the housing, with this subassembly being ultimately compressed onto an end portion of the stud with the ring remaining in tension to hold formed lugs on the ends of the housing within depressions on the reduced end of the stud, the ring, during the compression, forming said lugs on the ends of the housing.

A further object of the invention is to provide a method of fabricating rod-end bearings which is expeditious, simple, commercially practical, and which results in an effective and inexpensive rod-end bearing.

With the above and other objects in view, the invention consists of the improved rod-end bearing and the method of fabricating the same, and the parts, combinations and steps related thereto, as set forth in the claims, and all equivalents thereof.

In the accompanying drawing, in which the same reference characters indicate the same parts in all of the views.

Figure 1:
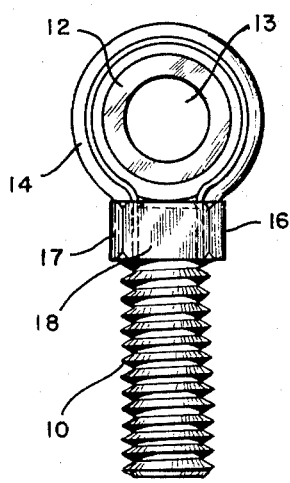
FIG. 1 is a front view of the improved rod-end bearing in its finished form.
Figure 2:
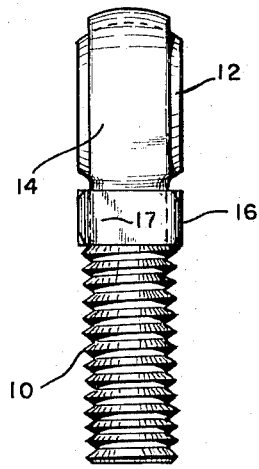
FIG. 2 is a side view thereof.

Although the rod-end bearing is shown in its assembled and completed form in FIGS. 1 and 2, the individual components thereof will first be described.

Figure 6:
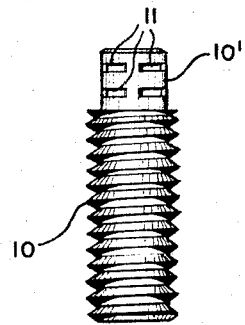
FIG. 6 is a detail view of the stud prior to being assembled with the other components.

In FIG. 6 is shown a stud 10 which can be manufactured in any desired manner and of a suitable metal. The upper outer end 10′ of the stud 10 may be, although it is not essential, of reduced cylindrical formation and has stamped thereinto a plurality of relatively small depressions or dents 11 for a purpose hereinafter to be described.

Figure 5:
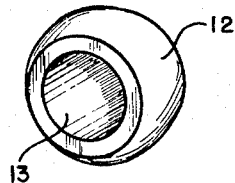
FIG. 5 is a perspective view of the bearing ball which is ultimately engaged within the housing.

A ball 12 shown in detail in FIG. 5 may be in the form of a truncated sphere with an enlarged axial bore 13 therethrough which, when the finished rod-end bearing is put into service, receives a shaft or other machine element. However, said ball could also be spherical with an integral stem and may be formed of any selected material such as metal, plastic or wood.

Figure 3:
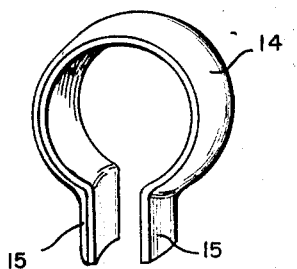
FIG. 3 is a front view, slightly in perspective of the stamped housing forming a part of the rod-end bearing assemblage.

The assemblage furthermore includes a housing 14, shown in detail in FIG. 3, which has an opening therein of a size to receive the ball 12 with the curvature of the opening conforming to the curved external shape of the ball. The curved body portion of the housing is formed with a pair of spaced-apart depending legs 15 of concavo-convex shape and the entire housing 14 is a metal stamping.

Figure 4:
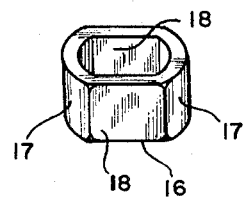
FIG. 4 is a perspective view of the ring member with flattened sides.

In FIG. 4 there is illustrated in detail another component of the assemblage which may be termed a ring 16, although the same is of ovate formation with curved end walls 17 conforming to the curvatures of the legs 15 of the housing 14 and flattened side walls 18.

The ring 16 is stamped with its ends 17 being curved to the proper radius. In the completed rod-end bearing, the tightly applied ring 16 actually forms a nut or stud head to the flattened surfaces 18 of which a wrench may be applied by the customer or user.

In assembling the various components of the improved rod-end bearing the ring element 16 is slipped over the legs 15 of the housing 14, with the flat portions 18 of the ring coinciding with the space between the housing legs 15 and the curved ends 17 of the ring overlying and snugly receiving said legs. After engaging the ring with the legs of the housing the reduced end portion 10′ of the stud 10 is fitted into the opening through the ring member 16 and is interposed tightly between the inner curved faces of the housing legs 15, as shown in dotted lines in FIG. 1. The assemblage contained within the ring is then compressed by a special tool. The metal from ring 16 under compression, plastically flows inwardly transmitting similar pressures through legs 15 of the housing 14, causing plastic flow of metal from legs 15 to substantially fill depressions 11 in the stud 10 at the 10′ area, forming extending lugs on the inner surface of the legs 15 intimately interlocked in the depressions 11. This interlock is held secure by the high tensions set up in ring 16 compressed around the assembly, providing torque resistance especially for uses of a wrench on the flats, and tensile strength for push or pull loads.

The method described results in a rod-end bearing which is easy and inexpensive to fabricate, and which provides a very efficient type of commercially acceptable rod-end bearing. In usage, of course, the rod or shaft to be journaled in the bearing is inserted into the opening 13 in the ball member, and the latter can universally move within the main portion of the housing 14.

It is to be understood that various changes and modifications may be made in the rod-end bearing and method of fabricating the same herein illustrated and described without departing from the spirit of the invention, and all of such changes and modifications are contemplated as may come within the scope of the appended claims.

I claim:

1. In the method of forming a rod-end bearing from a stud, a ring member and a housing with spaced apart depending legs, the steps of permanently uniting said members by inserting an end portion of the stud into the ring member and also inserting the legs of the housing into the ring member between inner surfaces of the ring and outer surface portions of the stud end, and then subjecting the assembled portions to such pressures as will firmly clamp together the nested portions of the ring, the housing legs and the stud end.

2. In the method of forming a rod-end bearing from a stud having an end portion with surface depressions therein, a ring member and a housing with spaced apart depending legs, the steps of permanently uniting said members by inserting said end portion of the stud into the ring member and also inserting the legs of the housing into the ring member between inner surfaces of the ring and outer surface portions of the stud end, and then subjecting the nested portion of the assembly to such pressures as will firmly clamp together the engaged portions of the ring, the housing legs and the stud end by displacing metal from the housing legs into the stud end depressions.

3. In the method of assembling a stud, a ring member, a housing with spaced apart depending legs and a bearing ball to provide a rod-end bearing, the steps of forming depressions in the side wall of an end portion of the stud, inserting the bearing ball into the housing, next inserting the legs of the housing into the ring member in firm engagement with inner side wall portions thereof, inserting said end portion of the stud into the ring in contact with the housing legs, and finally subjecting the assembly to such pressures as will firmly clamp together the nested portions of the ring, the housing legs and the stud end and will displace metal from the housing legs into the depressions in said end portion of the stud.

References Cited

UNITED STATES PATENTS

| | | | |
|---|---|---|---|
| 1,576,874 | 3/1926 | Stevens. | |
| 2,312,989 | 3/1943 | Lavarack. | |
| 1,814,999 | 7/1931 | Benjamin | 287—90 |
| 1,862,933 | 6/1932 | Huffred et al. | 287—85 |
| 2,424,914 | 7/1947 | Brown | 287—85 |
| 2,795,465 | 6/1957 | Dwyer | 308—72 |

CHARLIE T. MOON, *Primary Examiner.*